United States Patent
Yang et al.

(10) Patent No.: US 8,582,807 B2
(45) Date of Patent: Nov. 12, 2013

(54) SYSTEMS AND METHODS FOR DETERMINING PERSONAL CHARACTERISTICS

(75) Inventors: Ming Yang, Cupertino, CA (US); Shenghuo Zhu, Santa Clara, CA (US); Fengjun Lv, Cupertino, CA (US); Kai Yu, Santa Clara, CA (US)

(73) Assignee: NEC Laboratories America, Inc., Princeton, NJ (US)

( * ) Notice: Subject to any disclaimer, the term of this patent is extended or adjusted under 35 U.S.C. 154(b) by 583 days.

(21) Appl. No.: 12/790,979

(22) Filed: May 31, 2010

(65) Prior Publication Data

US 2011/0222724 A1 Sep. 15, 2011

Related U.S. Application Data

(60) Provisional application No. 61/313,878, filed on Mar. 15, 2010.

(51) Int. Cl.
*G06K 9/00* (2006.01)

(52) U.S. Cl.
USPC .......................................... 382/103; 704/270

(58) Field of Classification Search
USPC ......................................................... 382/103
See application file for complete search history.

(56) References Cited

U.S. PATENT DOCUMENTS

2006/0078163 A1* 4/2006 Rui et al. ....................... 382/103
2007/0219801 A1* 9/2007 Sundaram et al. ............. 704/270

OTHER PUBLICATIONS

Ying-Nong Chen; Chin-Chuan Han; Cheng-Tzu Wang; Bor-Shenn Jeng; Kuo-Chin Fan; , "The Application of a Convolution Neural Network on Face and License Plate Detection," Pattern Recognition, 2006. ICPR 2006. 18th International Conference on , vol. 3, No., pp. 552-555.*
Xin Geng, et al., Automatic Age Estimation Based on Facial Aging Patterns, IEEE Transactions on Pattern Analysis and Machine Intelligence, vol. 29, No. 12, pp. 2234-2240, 2007.
Andreas Lanitis, et al., Comparing Different Classifiers for Automatic Age Estimation, IEEE Transactions on Systems, Man, and Cybernetics, Part B: Cybernetics, vol. 34, No. 1, pp. 621-628, Feb. 2004.
Ming Yang, et al., Detection Driven Adaptive Multi-Cue Integration for Multiple Human Tracking, IEEE 12th International Conference on Computer Vision (ICCV), pp. 1554-1561, 2009.
Yann Lecun, Gradient-Based Learning Applied to Document Recognition, Proceedings of the IEEE vol. 86, No. 11, pp. 2278-2324, 1998.
Guodong Guo, Image-Based Human Age Estimation by Manifold Learning and Locally Adjusted Robust Regression, IEEE Transaction of Image Processing, vol. 17, No. 7, pp. 1178-1188, 2008.
Lanitis et al, Toward Automatic Simulation of Aging, IEEE Transactions on Pattern Analysis and Machine Intelligence, vol. 24, No. 4 Apr. 2002.
Golomb et al, Sexnet: A Neural Network Identifies Sex from Human Faces, In Touretzky, D.S., Lippman, R., (eds.) Advances in Neural Information Proscessing Systems 3, San Mateo, Morgan Kauffman, 1991.

* cited by examiner

*Primary Examiner* — Hadi Akhavannik
(74) *Attorney, Agent, or Firm* — Joseph Kolodka; Bao Tran

(57) ABSTRACT

Systems and methods are disclosed for determining personal characteristics from images by generating a baseline gender model and an age estimation model using one or more convolutional neural networks (CNNs); capturing correspondences of faces by face tracking, and applying incremental learning to the CNNs and enforcing correspondence constraint such that CNN outputs are consistent and stable for one person.

20 Claims, 4 Drawing Sheets

(a) Supervised incremental learning (b) Self-training incremental learning (c) Semi-supervised incremental learning

SYSTEMS AND METHODS FOR DETERMINING PERSONAL CHARACTERISTICS

This application claims priority from U.S. Provisional Application Ser. No. 61/313,878, filed Mar. 15, 2010, the content of which is incorporated by reference.

BACKGROUND

The present application relates to video analysis systems.

In recent years, intelligent video analysis systems, e.g. automatic gender and age estimation, face verification and recognition, and wide-area surveillance, are flourishing nourished by steady advances of computer vision and machine learning technologies both in theory and in practice. In general, certain statistical models are learned offline from a huge amount of training data in the development stage. However, when being deployed to real-world scenarios, these systems are often confronted by the model mismatch issue, that is, the performance degradation originated from the fact that training data can hardly cover the large variations in reality due to different illumination conditions, image quality, and noise, etc. It is extremely hard, if not impossible, to collect sufficient amount of training data in that the possible factors are unpredictable in different scenarios. Thus, it is desirable to allow the statistical models in visual recognition systems to adapt to their specific deployment scenes by incremental learning, so as to enhance the systems' generalization capability.

To address this model mismatch issue, people have developed various strategies working with training data block 10 and developing a model to apply to testing data block 20. The most straightforward and ideal way is to obtain the ground truth labels of the testing data block 20 in the deployment scene and utilize them to perform supervised incremental learning, as shown in FIG. 1(*a*). Nevertheless, manual labels are costly and sometimes impractical to obtain. Alternatively, these systems can trust the predictions by the model and simply employ them in incremental learning in a self-training manner as illustrated in FIG. 1(*b*). However, these positive feedbacks are very risky in practice. Another alternative way is to explore the structure and distances of unlabeled data using semi-supervised learning approaches as in FIG. 1(*c*), while, whether the heuristic distance metric can capture the correct underlining structure of unlabeled data is in question.

Inferring biological traits like gender and age from images can greatly help applications such as face verification and recognition, video surveillance, digital signage, and retail customer analysis. Both gender and age estimation from facial images have attracted considerable research interests for decades. Yet they remain challenging problems, especially the age estimation, since the aging facial patterns are highly variable and influenced by many factors like gender, race, and living styles, not to mention the subtleties of images due to lighting, shading, and view angles. Thus, sophisticated representations and a huge amount of training data have been required to tackle these problems in real-world applications.

SUMMARY

In one aspect, a computer implemented method determines personal characteristics from images by generating a baseline gender model and an age estimation model using one or more convolutional neural networks (CNNs); capturing correspondences of faces by face tracking, and applying incremental learning to the CNNs and enforcing correspondence constraint such that CNN outputs are consistent and stable for one person.

The system includes collecting correspondences of faces by face tracking. Incremental learning in the neural network can be done by enforcing a correspondence constraint. The system can implement incremental training with an online stochastic gradient descent process. A correspondence given by visual tracking can be used to update a pre-trained model. The system includes performing face detection and tracking; aligning the detected faces; normalizing the faces to a plurality of patches; and sending the normalized faces to the CNNs to estimate gender and age. CNNs can be used to face detection and face alignment. The system can perform multi-hypothesis visual tracking to obtain correspondence of faces in successive video frames. The system can update the baseline models using data collected online to avoid model drift. The system applies weakly supervised incremental training to face correspondences.

Advantages of the preferred embodiments may include one or more of the following. The video analysis systems based on statistical learning models maintains its performance when being deployed to a real-world scenario, primarily due to the fact that training data can cover unfamiliar variations in reality. The object correspondences in successive frames are leveraged as weak supervision to conduct incremental learning. The strategy is applied to the CNN based gender and age estimation system. The system maintains output consistent and stable results on face images from the same trajectory in videos by using incremental stochastic training. The supervision of correspondences can improve the estimation accuracy by a large margin. The strength of the correspondence driven incremental learning originates from the capability to address the mismatch problem due to the factors such as lighting conditions, view angels, and image quality or noise levels in the deployment environments, which may hardly be exactly the same as those in the training set. By forcing the models to produce consistent results for the same person, the models are adapted to be less sensitive to these factors. Therefore, the updated models outperform the original ones noticeably even when a small amount of additional data is added in the incremental learning. Moreover, the system is not restricted to gender and age estimation, and is also applicable to other facial attribute recognition, e.g. race, or face verification. Thus, the system can be applied to a number of personally identifiable characteristics as well.

DESCRIPTION

Commonly, pattern recognition consists of two steps: The first step computes hand-crafted features from raw inputs; and the second step learns classifiers based on the obtained features. The overall performance of the system is largely determined by the first step, which is, however, highly problem dependent and requires extensive feature engineering. Convolutional neural networks are a class of deep learning approaches in which multiple stages of learned feature extractors are applied directly to the raw input images and the entire system can be trained end-to-end in a supervised manner.

Figure 1:
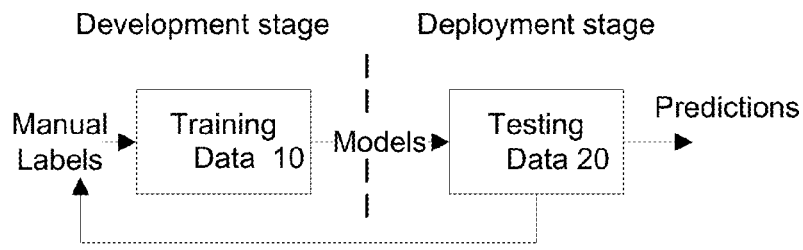
FIG. 1 shows various convolutional neural network (CNN) approaches to incremental learning.
Figure 1:
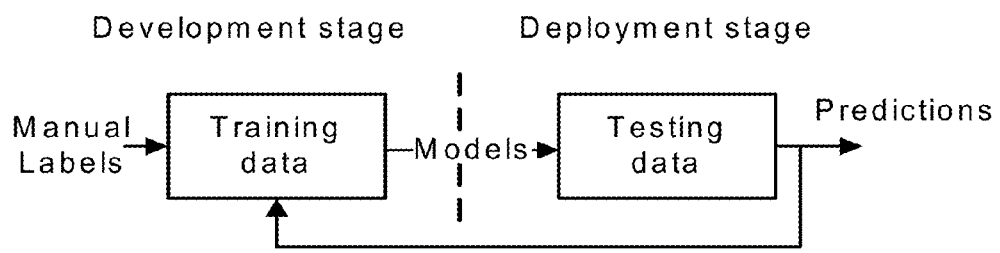
Figure 1:
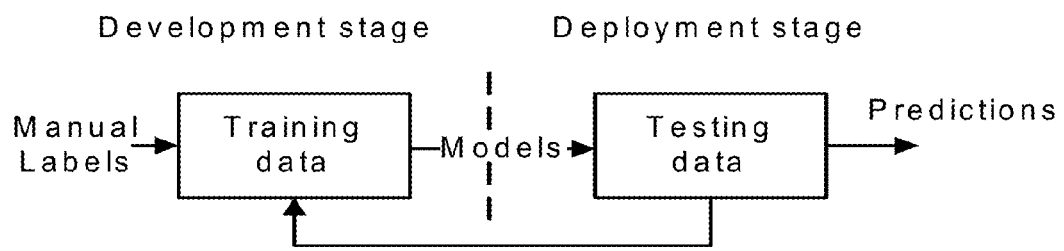
Figure 2:
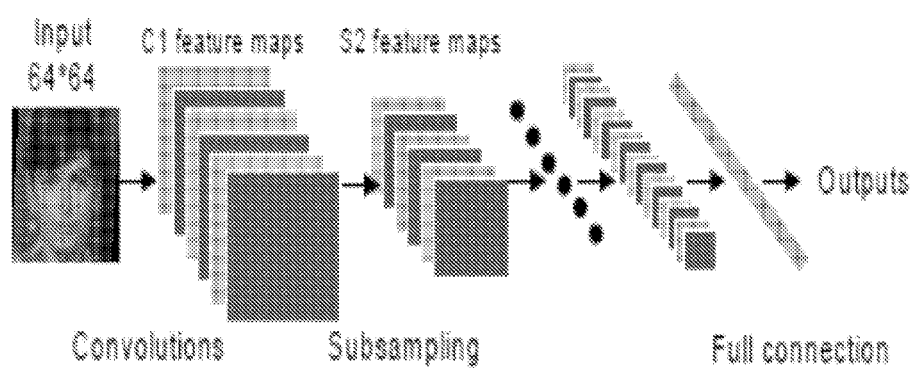
FIG. 2 shows an exemplary architecture of the convolutional neural networks (CNNs) where each plane represents a feature map.

FIG. 2 shows an exemplary architecture of the convolutional neural networks (CNNs) where each plane represents a feature map. As shown in FIG. 2, the convolution and subsampling operations are iteratively applied to the raw input images to generate multiple layers of feature maps. The adjustable parameters of a CNN model include all weights of the layers and connections which are learned by the back-propagation algorithm in a stochastic gradient descent manner. CNN models are appealing since the design of hand-crafted features are avoided and they are very efficient to evaluate at the testing stage, although in general the training of CNN models requires a large amount of data. The systems learn separate CNN models for gender, female age, and male age.

Figure 3:
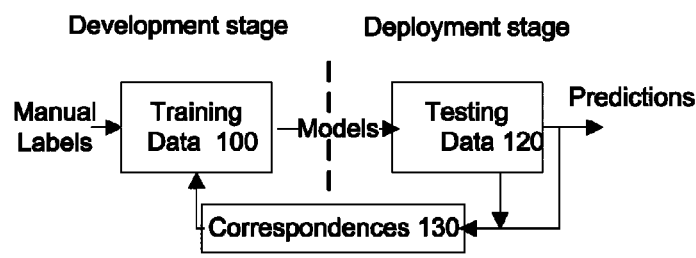
FIG. 3 shows an exemplary correspondence driven incremental learning capability in a gender and age estimation system.

The correspondence driven incremental learning are incorporated in the gender and age estimation system in FIG. 3. Training data 100 is manually labeled and used to generate one or more models during development stage. The models are used in deployment stage with testing dat 120 to generate predictions of age and gender. The predictions are also provided to a correspondence determination module 130 which provides training data to enhance the models.

Figure 4:
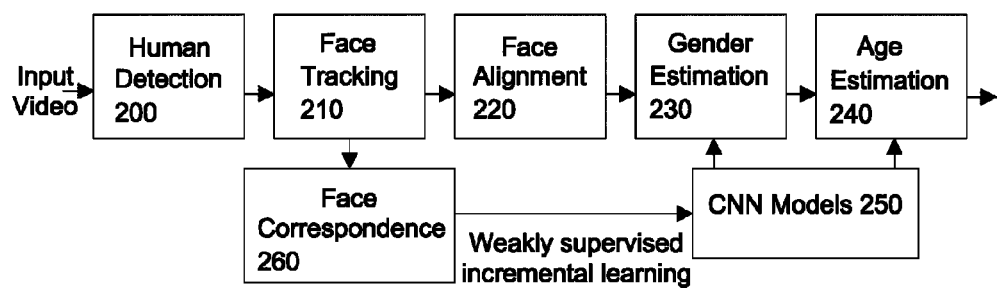
FIG. 4 shows an exemplary gender and age estimation system with correspondence driven incremental learning.

The system of FIG. 3 applies correspondence driven incremental learning strategy to a CNN-based gender and age estimation system in FIG. 4. Input video is provided to a face detection module 200, which then drives a face tracking module 210. The face is aligned by module 220, and the gender is estimated in module 230. Next, an age estimation module 240 is applied to generate the output. The face tracking module 210 also drives a face correspondence module 260, which applies weakly supervised incremental learning to one or more CNN models 250.

After collecting the face correspondences by visual tracking, the system derives an online stochastic training method to enforce the updated models to output consistent gender and age estimations for the same person. The system enables a pre-trained CNN model adapt to the deployment environments and achieves significant performance improvement on a large dataset containing 884 persons with 68759 faces. The correspondence driven approach can be readily integrated to a fully automatic video analysis system.

For every frame of the input video, the system performs face detection and tracking, then the detected faces are aligned and normalized to 64×64 patches and fed to the CNN recognition engine to estimate the gender and age. The face detection and face alignment modules are also based on certain CNN models. The system employs multi-hypothesis visual tracking algorithms to obtain the correspondence of faces in successive frames. The parameters are tuned to increase the precision of the tracker and tolerate the switch-id errors. Too short tracks are discarded.

The gender and age models trained offline using manually labeled faces are denoted by the Baseline CNN models. During processing a new video, the aligned faces and their correspondences given by visual tracking are stored as additional data which are used to update the Baseline CNN models periodically. Then, the updated CNN models are applied to new test videos. Note, we always update the Baseline models using the additional data collected online, not the latest updated CNN models, to avoid model drift.

Next, the details of the learning process are discussed. The Baseline neural network function can be represented by $y=F(X,\Omega_0)$, where X is the input, i.e., the raw image patch of a face, where $\Omega_0$ denotes the parameters of the original pre-trained CNN model, and the y is the output, for example the age, or the gender (−1 for females and 1 for males). For simplicity of description, this is the L2 loss regression problem. Other loss functions are also applicable to the derivation.

In the supervised incremental learning, given a set of additional training data S, each element of which is (X,y), where X is the input, y is the supervised label. The incremental training problem can be expressed as $$\min_{\Omega} J(\Omega) = \frac{\lambda}{2} \| \Omega - \Omega_0 \|^2 + \frac{1}{2|S|} \sum_{(X,y) \in S} (F(X, \Omega) - y)^2. \quad (1)$$

The first term keeps the parameter, $\Omega$, from deviating from the original parameters $\Omega_0$ with the regularization parameter $\lambda$. The second term reduces the loss on the additional training data. Thus, the stochastic gradient descent update rule for one training sample $(X_t, y_t)$ is $$\Omega \leftarrow \Omega - \gamma_t \left[ \lambda(\Omega - \Omega_0) + (F(X_t, \Omega) - y_t) \frac{\partial}{\partial \Omega} F(X_t, \Omega) \right]. \quad (2)$$

The idea of the correspondence driven incremental learning is to reduce the inconsistency of the neural network outputs for faces on the same trajectory, provided the parameters do not deviate from the original parameters of the Baseline CNN model, $\Omega_0$. For a given image $X \in S$ in the additional training image set, the set of all other faces on the same trajectory is denoted as a correspondence function T(X). Then, the correspondence driven incremental learning is written as this optimization problem, $$\min_{\Omega} J(\Omega) = \quad (3)$$
$$\frac{\lambda}{2} \| \Omega - \Omega_0 \|^2 + \frac{1}{4|S|} \sum_{X \in S} \frac{1}{|T(X)|} \sum_{Z \in T(X)} (F(X, \Omega) - F(Z, \Omega))^2.$$

The first term keeps the parameters, $\Omega$, from deviating from the original parameters $\Omega_0$, where we use regularization parameter $\lambda$ to control the deviation scale. The second term reduces the inconsistency of the neural network outputs of faces on the same trajectory. We normalize it by the size of S and the size of each trajectory, $|T(X)|$.

The derivative of the objective function of Eq. (3) can be written as, $$\frac{\partial J}{\partial \Omega} = \lambda(\Omega - \Omega_0) + \frac{1}{|S|} \sum_{X \in S} \frac{1}{|T(X)|} \sum_{Z \in T(X)} (F(X, \Omega) - F(Z, \Omega)) \frac{\partial}{\partial \Omega} F(X, \Omega).$$

Note that each pair of images, X and Z, appears twice in the summation. The stochastic update rule for each face image, $X_t$, is:

$$\Omega \leftarrow \Omega - \quad (4)$$

$$\gamma_t \left[ \lambda(\Omega - \Omega_0) + \frac{1}{|T(X_t)|} \sum_{Z \in T(X_t)} (F(X_t, \Omega) - F(Z, \Omega)) \frac{\partial}{\partial \Omega} F(X, \theta) \right] =$$

$$\Omega - \gamma_t \left[ \lambda(\Omega - \Omega_0) + (F(X_t, \Omega) - \tilde{y}_t) \frac{\partial}{\partial \Omega} F(X, \theta) \right],$$

where $$\tilde{y}_t = \frac{1}{|T(X_t)|} \sum_{Z \in T(X_t)} F(Z, \Omega),$$

$\gamma_t$ is the step size, the term $\lambda(\Omega-\Omega_0)$ is the weight decay. Intuitively, the average output of those images other than $X_t$ on the trajectory are used as the pseudo labels, $\tilde{y}_t$, for the incremental training Eq. (4) is in the same form as Eq. (2) except that the pseudo label $\tilde{y}_t$ is used in Eq. (4).

The updating process is implemented by the back propagation training for neural networks. Therefore, we can feed the pseudo labels into the existing training framework to perform the correspondence driven incremental learning. Because the validation set is not available, the stochastic training is only carried out in one pass, i.e., each additional data $X_t$ is used only once, which largely relieves the overfitting risk. Note, since the face images are collected sequentially from videos, data shuffle is critical in the stochastic training.

For a pair of face images, X and Z, the related items in the second term of Eq. (3) are $$\frac{1}{4|S|} \frac{1}{|T(X)|} (F(X, \Omega) - F(Z, \Omega))^2 + \frac{1}{4|S|} \frac{1}{|T(Z)|} (F(X, \Omega) - F(Z, \Omega))^2 =$$

$$\frac{1}{2|S|} \frac{1}{\sqrt{|T(X)||T(Z)|}} (F(X, \Omega) - F(Z, \Omega))^2,$$

because $|T(X)|=|T(Z)|$. This shows that the second term of Eq. (3) is exactly the term of normalized Laplacian regularization of a graph [?] whose nodes are images, and edges are those pairs of images in the same trajectory. Here our contribution is the stochastic training method for the normalized Laplacian regularization without explicitly using the Laplacian matrix. This training method allows the system to use the back propagation training framework to conduct the incremental learning.

Figure 5:
FIG. 5 shows an exemplary output of the age/gender analysis system.

FIG. 5 shows an exemplary output of the age/gender analysis system. The gender influences the age estimation considerably. Therefore, instead of using a unified age model for both male and female, this embodiment trains separate models for both gender groups. To study the performance of gender and age estimation independently, the system separates the males and females in the previous age estimation experiments. In the gender and age estimation system, the system predicts the gender first and then select the corresponding age model for age prediction. Some example screen shots are shown in FIG. 5, where the bounding boxes of faces are drawn in different colors to indicate the person identification. Gender and age range centered at our estimation are also shown. For instance, "7:F10-15" means that the person #7 is female with age ranging from 10 to 15.

Video analysis systems based on statistical learning models maintained its performance when being deployed to a real-world scenario, primarily due to the fact that training data can cover unfamiliar variations in reality. The object correspondences in successive frames are leveraged as weak supervision to conduct incremental learning. The strategy is applied to the CNN based gender and age estimation system. The system maintains output consistent and stable results on face images from the same trajectory in videos by using incremental stochastic training. On a video dataset containing 884 persons with 68759 faces, the supervision of correspondences can further improve the estimation accuracy by a large margin. The strength of the correspondence driven incremental learning originates from the capability to address the mismatch problem due to the factors such as lighting conditions, view angels, and image quality or noise levels in the deployment environments, which may hardly be exactly the same as those in the training set. By forcing the models to produce consistent results for the same person, the models are adapted to be less sensitive to these factors. Therefore, the updated models outperform the original ones noticeably even when a small amount of additional data is added in the incremental learning (e.g., around 6K to 10K faces are added in the ExpB in each video clip). The system is not restricted to gender and age estimation, and is also applicable to other facial attribute recognition, e.g. race. Thus, the system can be applied to a number of personally identifiable characteristics as well.

The invention may be implemented in hardware, firmware or software, or a combination of the three. Preferably the invention is implemented in a computer program executed on a programmable computer having a processor, a data storage system, volatile and non-volatile memory and/or storage elements, at least one input device and at least one output device.

By way of example, a computer to support the system is discussed next. The computer preferably includes a processor, random access memory (RAM), a program memory (preferably a writable read-only memory (ROM) such as a flash ROM) and an input/output (I/O) controller coupled by a CPU bus. The computer may optionally include a hard drive controller which is coupled to a hard disk and CPU bus. Hard disk may be used for storing application programs, such as the present invention, and data. Alternatively, application programs may be stored in RAM or ROM. I/O controller is coupled by means of an I/O bus to an I/O interface. I/O interface receives and transmits data in analog or digital form over communication links such as a serial link, local area network, wireless link, and parallel link. Optionally, a display, a keyboard and a pointing device (mouse) may also be connected to I/O bus. Alternatively, separate connections (separate buses) may be used for I/O interface, display, keyboard and pointing device. Programmable processing system may be preprogrammed or it may be programmed (and reprogrammed) by downloading a program from another source (e.g., a floppy disk, CD-ROM, or another computer).

Each computer program is tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

The invention has been described herein in considerable detail in order to comply with the patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. A computer implemented method to classify camera images, comprising:
   a. generating a baseline gender model and an age estimation model using one or more convolutional neural networks (CNNs);
   b. capturing correspondences of faces by face tracking;
   c. applying a stochastic update rule for each face image determined as $$\Omega - \gamma_t \left[ \lambda(\Omega - \Omega_0) + (F(X_t, \Omega) - \tilde{y}_t) \frac{\partial}{\partial \Omega} F(X, \theta) \right],$$

where $$\tilde{y}_t = \frac{1}{|T(X_t)|} \sum_{Z \in T(X_t)} F(Z, \Omega),$$

$\gamma_t$ is a step size, term $\lambda(\Omega - \Omega_0)$ represents weight decay, and a baseline neural network function is $y = F(X, \Omega_0)$, and
   d. applying incremental learning to the CNNs and enforcing correspondence constraint such that CNN outputs are consistent and stable for one person.

2. The method of claim 1, comprising collecting correspondences of faces by face tracking.

3. The method of claim 1, comprising providing incremental learning in the neural network by enforcing a correspondence constraint.

4. The method of claim 1, comprising implementing incremental training with an online stochastic gradient descent process.

5. The method of claim 1, comprising applying a correspondence given by visual tracking to update a pre-trained model.

6. The method of claim 1, comprising:
   a. performing face detection and tracking;
   b. aligning the detected faces;
   c. normalizing the faces to a plurality of patches; and
   d. sending the normalized faces to the CNNs to estimate gender and age.

7. The method of claim 1, comprising applying CNNs to face detection and face alignment.

8. The method of claim 1, comprising performing multi-hypothesis visual tracking to obtain correspondence of faces in successive video frames.

9. The method of claim 1, comprising updating the baseline models using data collected online to avoid model drift.

10. The method of claim 1, comprising applying weakly supervised incremental training to face correspondences.

11. A system to classify camera images, comprising
    a. means for generating a baseline gender model and an age estimation model using one or more convolutional neural networks (CNNs);
    b. means for capturing correspondences of faces by face tracking;
    c. means for applying a stochastic update rule for each face image determined as $$\Omega - \gamma_t \left[ \lambda(\Omega - \Omega_0) + (F(X_t, \Omega) - \tilde{y}_t) \frac{\partial}{\partial \Omega} F(X, \theta) \right],$$

where $$\tilde{y}_t = \frac{1}{|T(X_t)|} \sum_{Z \in T(X_t)} F(Z, \Omega),$$

$\gamma_t$ is the step size, term $\lambda(\Omega - \Omega_0)$ represents weight decay, and a baseline neural network function is represented by $y = F(X, \Omega_0)$, and
    d. means for applying incremental learning to the CNNs and enforcing correspondence constraint such that CNN outputs are consistent and stable for one person.

12. The system of claim 11, comprising means for collecting correspondences of faces by face tracking.

13. The system of claim 11, comprising means for providing incremental learning in the neural network by enforcing a correspondence constraint.

14. The system of claim 11, comprising means for implementing incremental training with an online stochastic gradient descent process.

15. The system of claim 11, comprising means for applying a correspondence given by visual tracking to update a pre-trained model.

16. The system of claim 11, comprising:
    a. means for performing face detection and tracking;
    b. means for aligning the detected faces;
    c. means for normalizing the faces to a plurality of patches; and
    d. means for sending the normalized faces to the CNNs to estimate gender and age.

17. The system of claim 11, comprising means for applying CNNs to face detection and face alignment.

18. The system of claim 11, comprising means for performing multi-hypothesis visual tracking to obtain correspondence of faces in successive video frames.

19. The system of claim 11, comprising means for updating the baseline models using data collected online to avoid model drift.

20. The system of claim 11, comprising means for applying weakly supervised incremental training to face correspondences.

* * * * *